US005185672A

United States Patent [19]

Rousseau et al.

[11] Patent Number: 5,185,672

[45] Date of Patent: Feb. 9, 1993

[54] LINER FOR DEFLECTION YOKE

[75] Inventors: Jean Rousseau, Auxonne; Claude Richard, Brazey-en-Plaine, both of France

[73] Assignee: Videocolor S.A., Paris, France

[21] Appl. No.: 580,427

[22] Filed: Sep. 10, 1990

[30] Foreign Application Priority Data

Dec. 8, 1989 [EP] European Pat. Off. ........ 89403411.5

[51] Int. Cl.[5] .............................................. H04N 5/657

[52] U.S. Cl. ...................................... 358/248; 358/254

[58] Field of Search ................ 358/254, 248; 335/210; 340/720

[56] References Cited

U.S. PATENT DOCUMENTS

| | | | |
|---|---|---|---|
| 3,189,775 | 6/1965 | Fyler | 358/254 |
| 4,095,260 | 6/1978 | Suzuki | 358/248 |
| 4,117,516 | 9/1978 | Yasuhara | 358/248 |
| 4,186,414 | 1/1980 | Barinek | 358/248 |
| 4,195,315 | 3/1980 | Pytlarz et al. | 358/248 |
| 4,285,013 | 8/1981 | Brunn et al. | 358/248 |
| 5,028,898 | 7/1991 | Tsukii et al. | 335/210 |

FOREIGN PATENT DOCUMENTS

| | | | |
|---|---|---|---|
| 3010262 | 3/1981 | Fed. Rep. of Germany . | |
| 3315448 | 10/1984 | Fed. Rep. of Germany | 358/254 |
| 1586100 | 3/1981 | United Kingdom . | |

OTHER PUBLICATIONS

Drawing FIGS. 3 and 4 produced by Videocolor, Inc., France.

*Primary Examiner*—Edward L. Coles, Sr.
*Assistant Examiner*—Thomas L. Stoll
*Attorney, Agent, or Firm*—Joseph S. Tripoli; Joseph J. Laks; Sammy S. Henig

[57] ABSTRACT

A liner for a deflection yoke assembly for a CRT includes four substantially equally spaced inclined semicircular channel-like mounting studs, arranged about the circumference of a band-like ring about the front of the liner. Threaded sleeves are push mounted upon and ultrasonically welded to an associated mounting stud. Hollow alignment bolts are screwed into each threaded sleeve, and adjustably positioned relative to the cone of a CRT for aligning the yoke to its associated CRT.

14 Claims, 8 Drawing Sheets

LINER FOR DEFLECTION YOKE

The invention relates to deflection yoke assemblies, and more particularly to such assemblies including adjustable screws or bolts about the front face or bezel of a liner of a deflection yoke for adjusting the alignment of the deflection yoke to its associated cathode ray tube (CRT).

The importance of providing a deflection yoke assembly with mechanisms for permitting the yoke assembly to be adjusted relative to its orientation to an associated CRT upon which it is mounted is well known in the art.

German laid open Application No. DE3010262, entitled "Method for the Aligning and Fastening of a Deflection Coil Arrangement", laid open date being 1981, the inventor being Roth Arnold, (The Arnold Patent Application) teaches as shown in FIG. 1 hereof, the mounting of a deflection coil 2 upon a color cathode ray tube or CRT 1, with three adjustable fastening sites 3. As shown in FIG. 2, hereof, a mounting portion 5 of a deflection coil includes a threaded insert 7, which is inserted into a hole through a circumferential hole in the forward portion of mounting portion 5 of the deflection coil. A hollow bolt 6 is screwed through threaded insert 7, causing threaded insert 7 to expand and become wedged in the opening of the mounting portion 5. The hollow bolt 6 at the mounting sites 3 are adjustably screwed against the outside of the tube wall 4 for axially aligning the deflection coil on CRT 1. After aligning deflection coil 2 to the CRT, an adhesive 9 is injected through the hollow bolts to fill the area between a tube wall 4 and the inner space of a collar 8 used to contain the adhesive. Upon setting, the adhesive locks the bolt into position, for retaining the alignment of the deflection coil 2 to the CRT 1. The fabrication step of inserting insert 7 into the hole may be complex and, hence, may increase the fabrication cost.

With reference to FIG. 3, a prior art deflection yoke assembly 20 produced by Videocolor, Inc., France, for a television receiver, includes a forwardmost mounting ring or bezel 22 including four inclined mounting studs or sleeves 24 substantially equally spaced from one another around the outer circumference of the mounting ring 22, in this example. Sleeves 24 and ring 22 are made in the same molding process as one piece. As will be described in greater detail below, hollow bolts 26 are threadably mounted in mounting studs or sleeves 24. The front or forward ends of the bolts 26 each include a contact head 28 for contacting a cone of an associated CRT. Windings 30 of the deflection coil assembly 20 as shown, can be of any desired pattern.

In FIG. 4, the prior art deflection yoke assembly 20 of FIG. 3 is shown mounted on a cone 32 of an associated CRT. Also shown affixed to the deflection yoke or coil assembly 20 are a standoff panel 34, and a wiring terminal ring 36 at the rear portion thereof. A sheath beam bender 38 is also shown, along with the rearmost portion 40 of the CRT. The angle of the inclined mounting sleeves 24 is predetermined to insure that contact heads 28 of hollow bolts 26 make contact with a maximum area of cone 32 of the associated CRT. Since contact head 28 of a given hollow bolt 26 has a face that is at 90° to the longitudinal access of such given hollow bolt 26, the angle of the mounting sleeves 24 are such that the longitudinal axis of the hollow bolts 26 is perpendicular to the point where the axis intersects the wall of the cone 32. In this manner, highly accurate alignment of the deflection yoke 20 to the CRT is provided. Such positioning and alignment of bolts 26 or similar bolts is retained in the present invention, as described later on.

The hollow bolts 26 as shown in FIGS. 5 and 6, as will be described in greater detail below, include a back end 42 adapted for receiving a tool for turning the bolt 26, and an outwardly flaring saucer-like contact head 44. The front of the contact head 44 includes a cap-like member 46 fabricated from an elastomer such as a plastic material, for contacting the typically glass surface of the cone 32, for example. The hollow bolt 26 is fabricated from a dielectric material, such as a rigid plastic material, for example. U-shaped cutout portions 48 (four are shown in this example) are provided equally spaced about the outer circumferential portion of the contact head 44, as shown. The cutouts 48 permit a spring-like action to be provided by the outer portions of the contact head 44 contacting the cone 32.

Sleeves 24 and ring 22 are produced as one piece in a molding process. Because of the different orientations or angles of the holes of hollow sleeves 24 that are not coaxial with one another and with ring or bezel 22, it may be difficult to produce the female threads in each hole. Such difficulty may be encountered either in a situation in which such threads are made after the molding process is completed or in a situation in which such threads are made during the molding process.

In carrying out an aspect of the invention, a deflection yoke assembly includes a mounting ring or bezel. The mounting ring includes inclined semicircular or split tubular-like mounting studs or bosses arranged about an outside surface of the circumference of the mounting ring, for receiving in each inclined mounting stud a threaded sleeve having securing and indexing means about its outer wall, for permitting alignment via mating with indexing means on an associated stud, and ultrasonic bonding of the sleeve to its associated inclined mounting stud. Hollow threaded bolts are screwed into each one of the threaded mounting sleeves. The frontmost portion of the hollow bolts include contact head means for contacting the surface of the cone of the associated CRT at substantially a 90° angle, with substantially the entire portion of the contact head means contacting the cone. The back end or opposite end of the hollow bolt includes slots for receiving a tool for permitting the bolt to be adjustably turned in and out of its associated threaded sleeve for axially adjusting the deflection yoke to the CRT.

A deflection yoke assembly embodying an aspect of the invention, for a CRT includes a truncated cone-shaped liner having a ring-like front bezel for mounting over rear diverging walls and neck of the CRT. A plurality of threaded internally hollow sleeves are formed as separate pieces prior to being mounted over an outside surface of the ring-like front bezel of the liner. The sleeves are mounted on the outside surface at corresponding spaced apart locations around a circumference of the front bezel of the liner. A plurality of threaded bolts are adapted to be threadedly received in the plurality of threaded sleeves, respectively. A given one of said bolts, when being threaded in the corresponding sleeve, has a contact head end portion projecting outside the corresponding bolt receiving sleeve for aligning the liner, that carries deflection coils, at a predetermined position relative to the CRT to provide a required beam landing registration of an electron beam on a faceplate of the CRT.

Similar symbols and numerals in FIGS. 1-17 indicate similar items or functions.

Figure 7A:
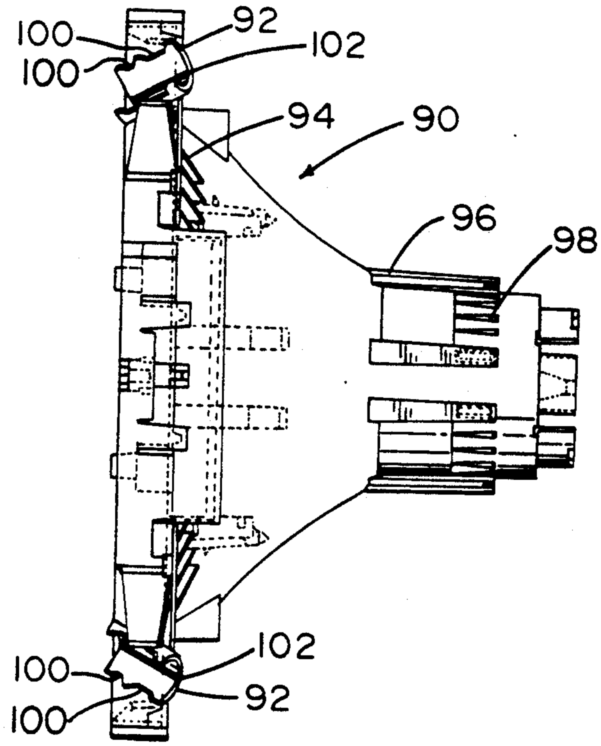
FIGS. 7A, 7B and 7C are side, front and rear elevational views of a deflection yoke assembly of one embodiment of the invention without threaded sleeves secured to their associated inclined mounting studs.
Figure 7B:
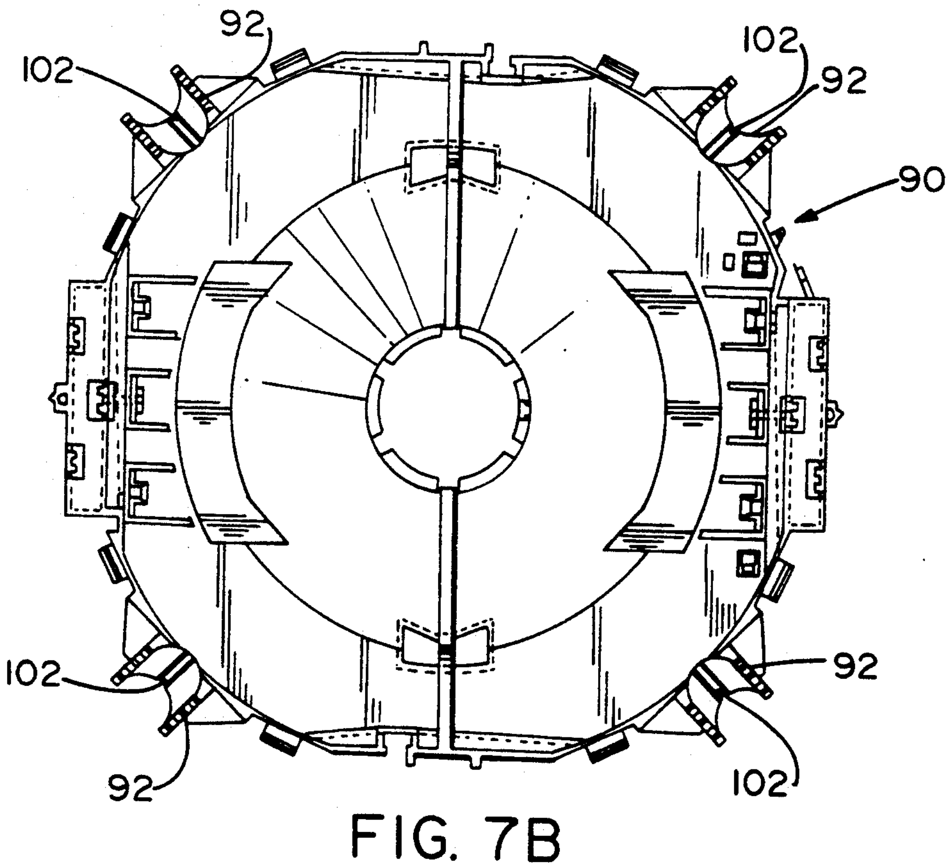
Figure 7C:
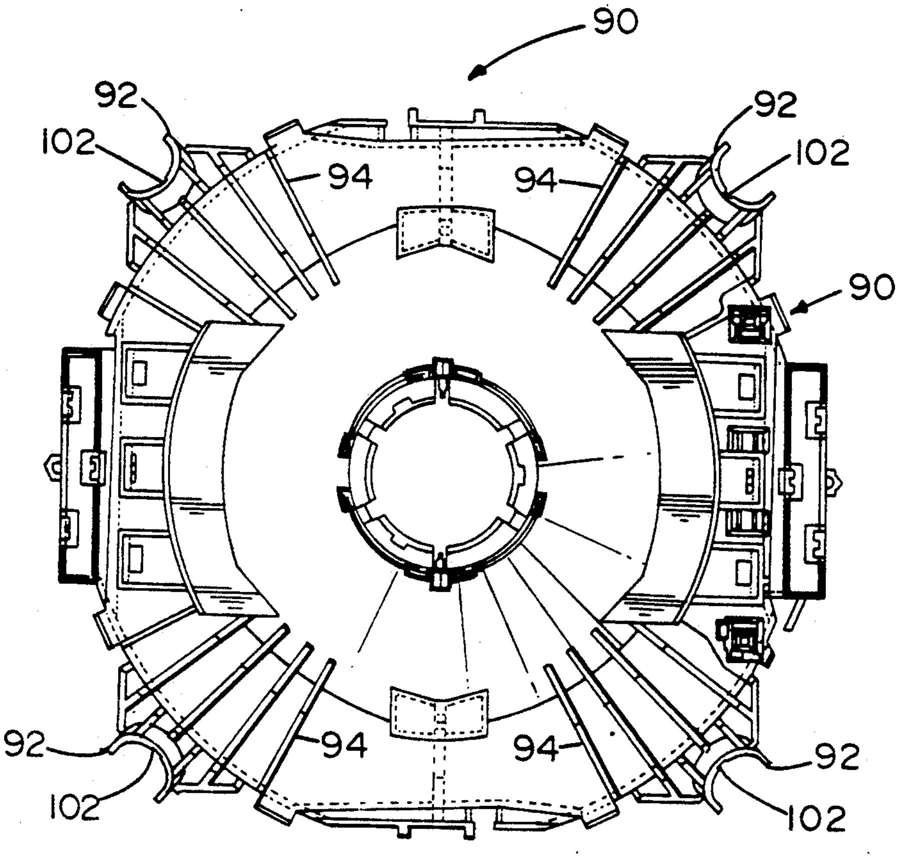

FIGS. 7A, 7B and 7C illustrate a linear 90, embodying an aspect of the invention. The linear 90 is similar in some respects to the liner or bezel 22 of the prior deflection yoke assembly 20 of FIG. 3, with the differences noted below. One major difference is the provision of inclined semicircular or split tubular-like studs or bosses 92 of FIGS. 7A-7C for receiving in each a corresponding threaded sleeve 50 as shown in FIGS. 8, 9, 10A and 10B, the latter being described in detail below.

Figure 3:
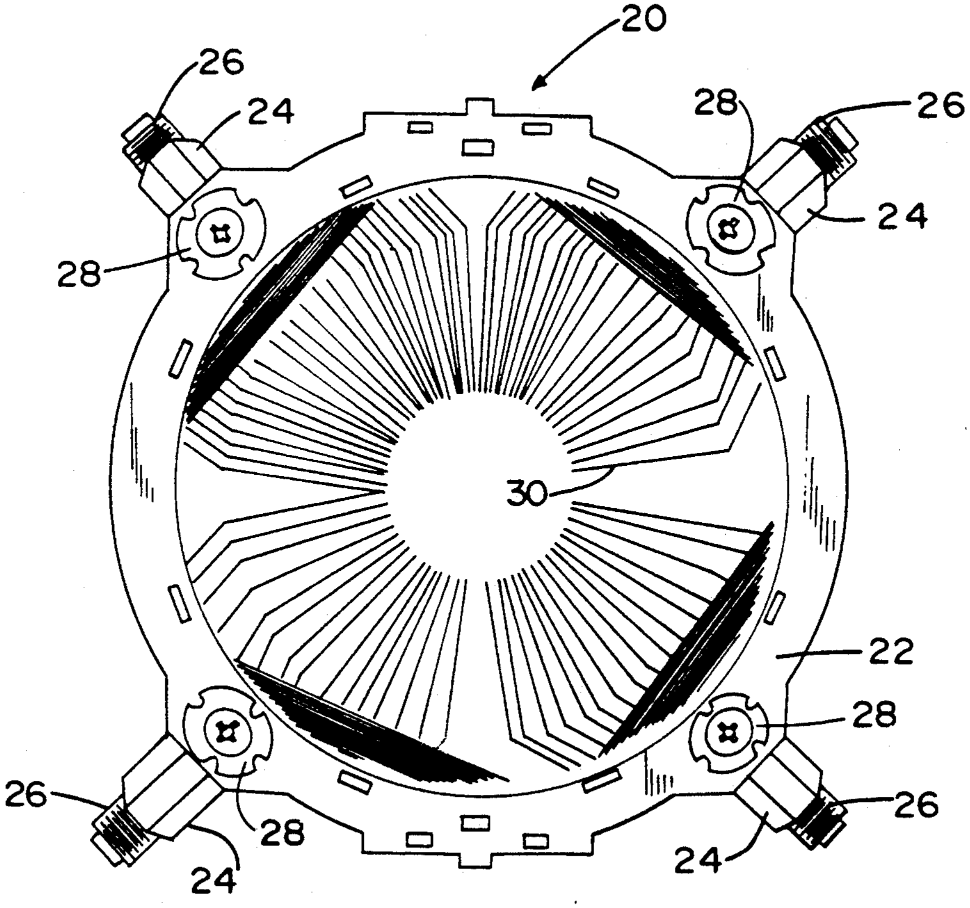
FIG. 3 (PRIOR ART)
FIG. 3 is a front pictorial view of another prior art deflection yoke assembly.
Figure 4:
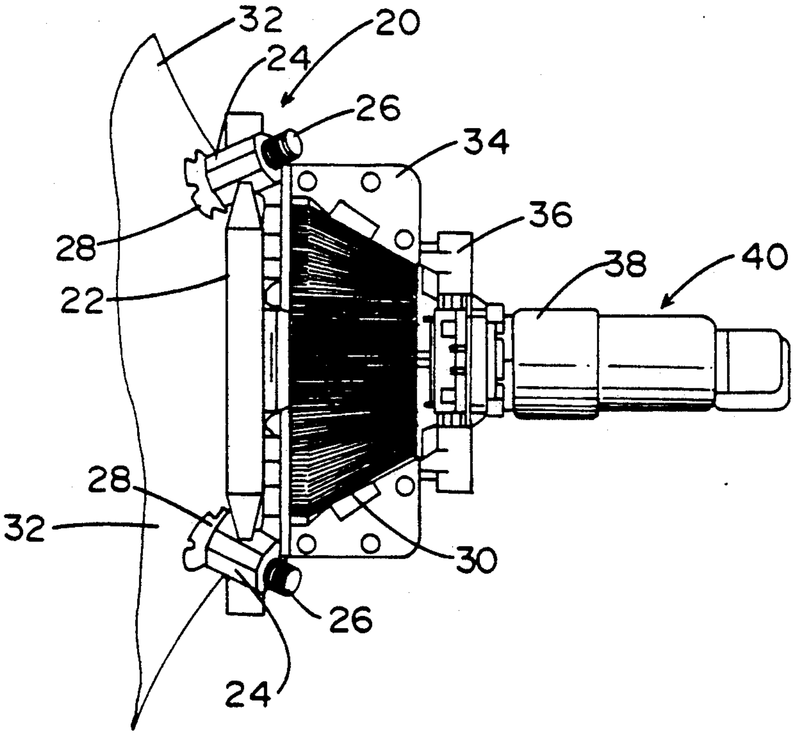
FIG. 4 (PRIOR ART)
FIG. 4 is a pictorial side view of the deflection yoke assembly of FIG. 3 as mounted on a CRT.
Figure 17:
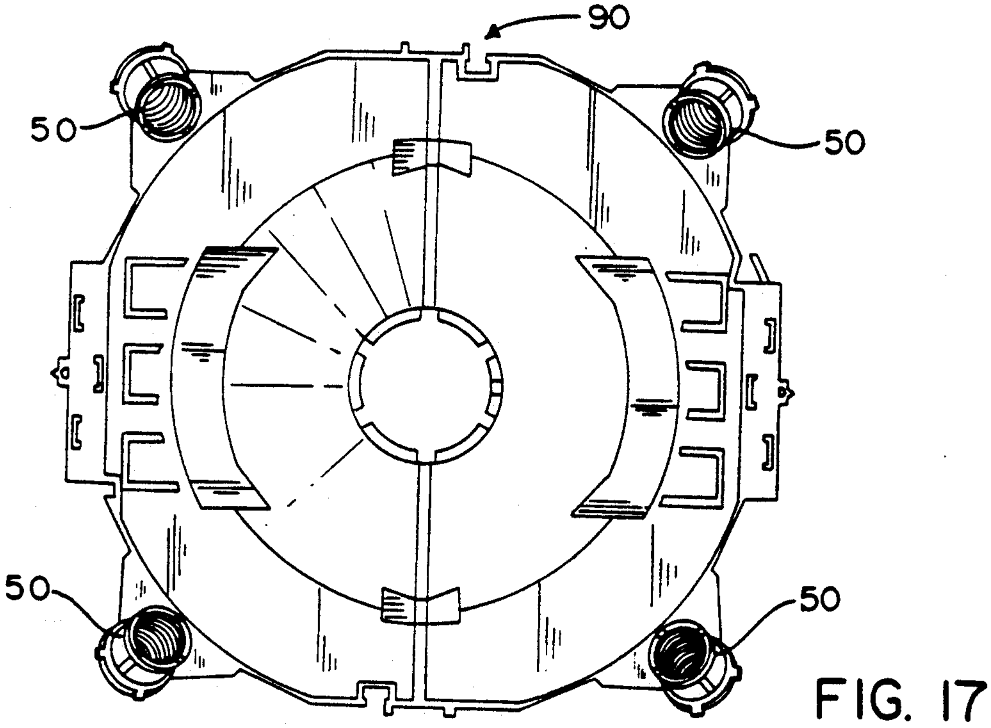
FIG. 17 is a front pictorial view of one embodiment of the invention.

In accordance with a feature of the invention, the threaded sleeves 50 are fabricated as separate pieces apart from the liner 90, and are then mounted in the semicircular studs or bosses 92, on the outside surface of liner 90, as shown in FIG. 17. In contrast, sleeves 24 of the prior art of FIG. 3 are fabricated as one piece with liner 22. Because sleeves 50 of FIG. 17 are initially fabricated apart from linear 90, making the internal female threads in each of sleeves 50 is substantially simpler than if sleeves 50 were attached to linear 90 when the threads in sleeves 50 were made. For example, the internal threads of a given sleeve 50 can be made during the molding process of such sleeve. Note that the studs 92 of FIGS. 7A-7C are inclined in a similar manner to that of the sleeves 24 of the prior deflection yoke assembly 20 of FIG. 3 so as to orient sleeves 50 in the proper directions.

Figure 1:
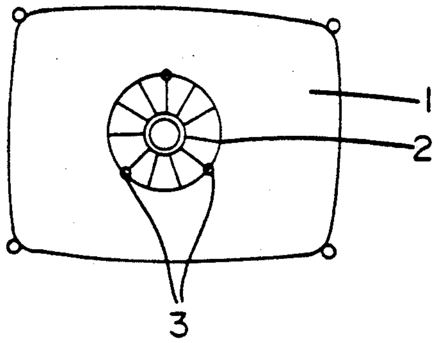
FIG. 1 (PRIOR ART)
FIGS. 1 and 2 are identical to FIGS. 1 and 2 including the same reference designations, of German Patent Application DE3010262.
Figure 2:
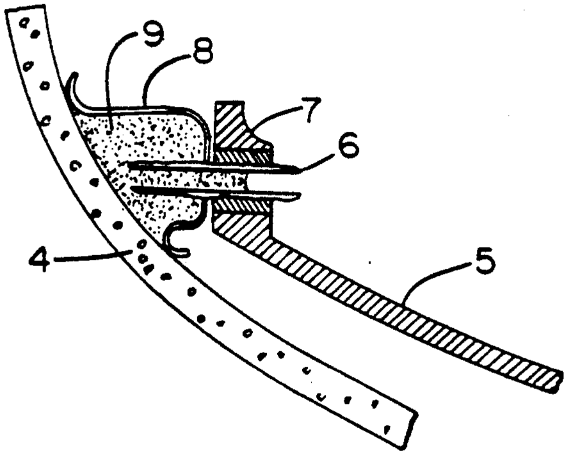
FIG. 2 (PRIOR ART)

Other features of the liner 90 of FIGS. 7A-7C for yoke assembly include ribs 94, 96 and 98. The inclined semicircular studs 92 include on each side edge notches or notch-like recesses 100, and a centrally located channel or keyway 102, for moting or indexing with standoffs 54, and one of the keys 51 of sleeves 50, respectively. Note also that the sleeves 50, which include internal threads for receiving a hollow bolt such as bolt 26 of FIGS. 5 and 6 or bolt 52 of FIG. 8, also include a band-like flange 53 about their front faces, and another band-like flange 55 located slightly inward from their rear faces 57. The front flange 53 and rear flange 55 of a given sleeve 50 have their immediately opposing inside facial portions distanced from one another a length that is only slightly greater than the axial length of the semicircular studs 92. In this manner, when a given threaded sleeve 50 is pressed into an associated incline semicircular mounting stud 92, it will be properly aligned with and fit snugly into the stud 92. Therefore it is easier to insert a given sleeve 50 into mounting stud 92, that is semicircular, than to a hole such as shown in FIG. 2. In this way, the mounting of sleeves 50 of FIG. 8 in liner 90 of FIGS. 7A-7C is, advantageously, simplified. The result is that the entire length of each of sleeves 50 protrudes from linear 90.

Figure 8:
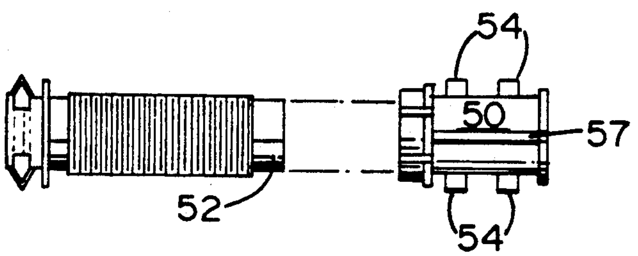
FIG. 8 is a side pictorial exploded assembly diagram of a hollow adjusting bolt and threaded sleeve of an embodiment of the invention.

A given insert 7 of FIG. 2 of the Arnold Patent Application that has to be inserted into a hole in an apparently complicated fabrication process, as indicated before. In contrast, a given sleeve 50 of FIG. 8 is pressed into an outside facing surface of the corresponding stud 92, thus providing a simplified fabrication process. Ultrasonic welding or appropriate epoxy adhesives may be used to rigidly secure the threaded sleeves 50 to their associated inclined semicircular mounting studs 92.

The liner 90 of the present deflection coil assembly is molded from a dielectric material, such as a plastic material, in one piece with the semicircular mounting studs 92. The liner 90 can be dimensioned for accommodating any size yoke.

Figure 5:
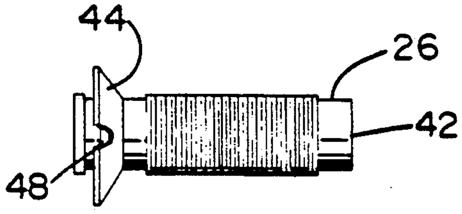
FIG. 5 is a side pictorial view of a hollow adjusting or alignment bolt used in one embodiment of the invention and in the arrangement of FIG. 3.
Figure 6:
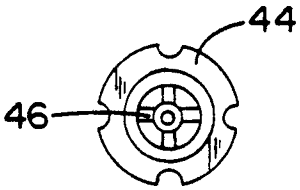
FIG. 6 is a front pictorial view of the hollow adjusting bolt of FIG. 5.
Figure 9:
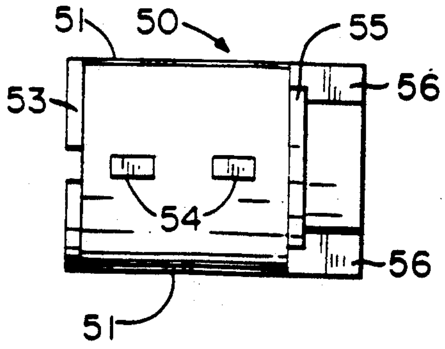
FIG. 9 is a side elevation view of the threaded sleeve of FIG. 8.
Figure 10A:
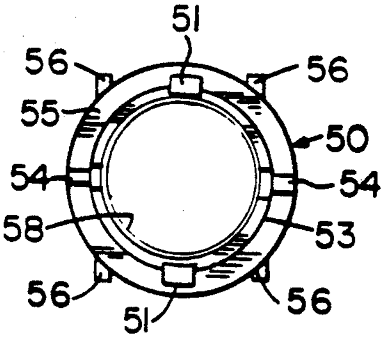
FIG. 10A is a plan front elevation view of the threaded sleeve of FIG. 9.
Figure 10B:
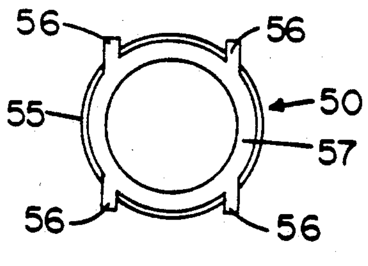
FIG. 10B is a plan rear elevation view of the threaded sleeve.

Bolts 26 of FIGS. 5 and 6, in one embodiment of the invention, may be screwed into the threaded sleeves 50 affixed to associated mounting studs 92. In an alternative embodiment of the invention, hollow bolts 52 of FIG. 8 are screwed into the threaded sleeves 50. The alternative hollow bolts 52 are described in detail below, as are the hollow bolts 26. The threaded inserts 50, as shown in FIGS. 9, 10A and 10B, as previously described, include the two pairs of standoffs 54 on immediately opposite sides of the threaded insert 50. Two other pairs of standoffs 56 are located on opposite sides of the top and bottom portions of a given threaded insert 50, as shown in FIGS. 10A and 10B. Note that the standoffs 54 are in a plane that is perpendicular to the planes of the standoffs 56. Female threads 58 are provided within the inserts 50, as shown.

Figure 11:
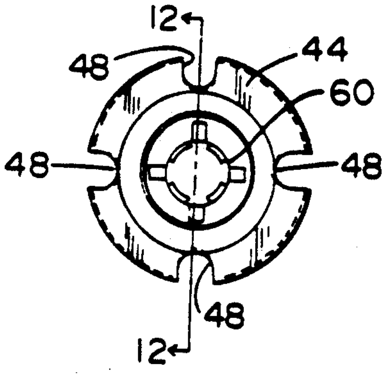
FIG. 11 is a plan front view of a hollow bolt of another embodiment of the invention.
Figure 12:
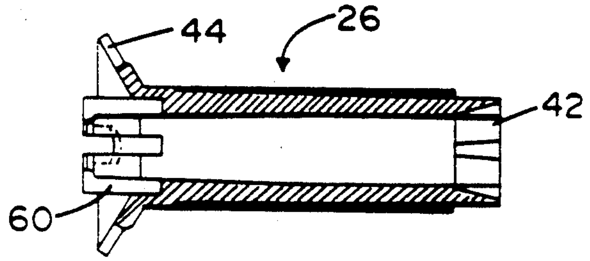
FIG. 12 is a side-elevation view in partial section of the hollow bolt of FIG. 11.
Figure 13:
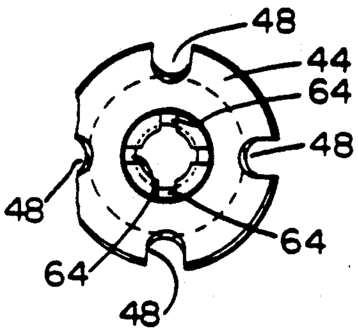
FIG. 13 is a partial plan rear view of the hollow bolt of FIGS. 11 and 12.

With reference to FIGS. 11, 12 and 13, the hollow bolts 26 are shown in detail. Note the cap stud 60 at the front portion of the bolt 26, of this embodiment, for receiving the elastic cap 28 (see FIG. 3). Also note, in FIG. 13, the two pairs of opposing slots 64 for receiving a tool for turning a given bolt 26 threaded into an associated sleeve 50 of FIG. 10A. The positioning, alignment and function of bolts 26 are similar in the arrangements of FIGS. 4, 7A-7C and 17.

Figure 14:
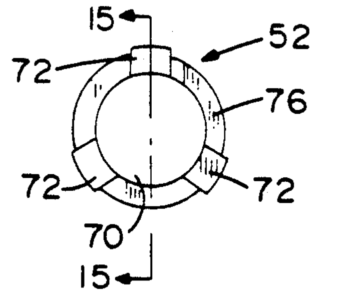
FIG. 14 is a plan front view of a hollow bolt of another embodiment of the invention.
Figure 15:
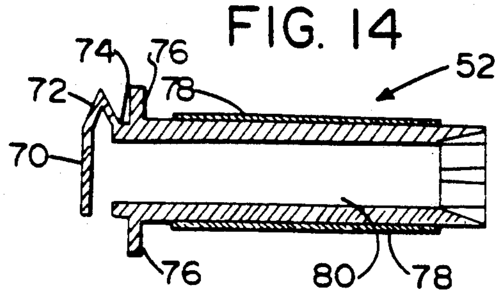
FIG. 15 is a side-elevation view in cross section of the hollow bolt of FIG. 14.
Figure 16:
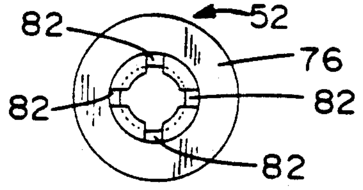
FIG. 16 is a plan rear view of the hollow bolt of FIGS. 14 and 15.

In another embodiment of the invention, as shown in detail in FIGS. 14, 15 and 16, an alternative adjustable or hollow bolt configuration 52 is shown. The bolt 52 is fabricated in one piece from a molded plastic material, for example. The front of the bolt includes a contact head 70 connected by elastic V-springs 72 to the front portion of a bridge segment 74. A circular collar 76 is located immediately behind the bridge segment 74. Threads 78 are provided about a substantial portion of the body of the bolt 52 behind the collar 76. The center of the bolt 52 is a hollow cavity 80 that is cylindrical in shape. Two pairs of opposing slots 82, located centrally at the rear of bolt 52, as shown in FIG. 16, are for receiving a tool (not shown) for turning bolt 52 into and out of an associated threaded sleeve 50.

What is claimed is:

1. A deflection yoke assembly for a cathode ray tube (CRT), comprising:

a liner having a ring-like front bezel for mounting over rear diverging walls and neck of said CRT;

a plurality of threaded internally hollow sleeves that are formed as separate pieces prior to being mounted over an outside surface of said ring-like front bezel of said liner;

means for rigidly mounting said sleeves on said outside surface at corresponding spaced apart locations around a circumference of said front bezel of said liner;

a plurality of threaded bolts adapted to be threadedly received in said plurality of threaded sleeves, respectively, a given one of said bolts, when being threaded in the corresponding sleeve, having a contact head member projecting outside the corresponding bolt receiving sleeve for aligning said liner that carries deflection coils at a predetermined position relative to said CRT to provide alignment of the yoke assembly on said CRT; and a plurality of studs located at said spaced apart locations, respectively, for mounting therein said threaded sleeves, respectively.

2. An assembly according to claim 1, further comprising, first and second mating means upon each one of said plurality of studs and sleeves, respectively, for providing positive mating and fixed orientation between associated ones of said plurality of studs and sleeves.

3. An assembly according to claim 2, wherein said first mating means includes on each of said plurality of studs a channel through the center of an inside face, and at least two spaced apart notches along each of opposing top edges, all for mating with said second mating means.

4. An assembly according to claim 3 wherein said second mating means includes on each of said plurality of sleeves at least two pairs of standoffs on opposing sides, for mating with the notches of an associated mounting stud, and further includes at least one longitudinal outer rib lying in a plane perpendicular to the plane intercepting said standoffs, said rib serving as a key to mate with said channel of said associated stud.

5. An assembly according to claim 3, wherein said second mating means further includes a first band-like collar at one end of an associated sleeve, and a second band-like collar inward of the opposite end of said sleeve, said first and second collars each projecting away from the outside wall of their associated sleeve, and being spaced apart a distance substantially the same as the length of each one of said plurality of studs, for providing a snug frictional fit therebetween.

6. An assembly according to claim 1, wherein each one of said plurality of studs is inclined at an angle predetermined for causing the central axis thereof to intercept at about 90° a given one of said diverging walls of the cone of said CRT.

7. An assembly according to claim 1, wherein said liner and said plurality of studs are fabricated in one piece.

8. An assembly according to claim 6, wherein said liner and said plurality of studs consist of a plastic material.

9. A liner for a deflection yoke assembly of a cathode ray tube (CRT), comprising:

a front bezel formed via a band-like ring having a width parallel to the central longitudinal axis of said liner;

a plurality of studs mounted spaced apart about the outside width of said front bezel, each stud being inclined at an angle predetermined for causing the central axis thereof to intercept an outside wall of the cone of an associated CRT at approximately 90°;

said plurality of studs each including a channel through the center of an inside face, and at least two spaced apart notches along each of opposing top edges;

a plurality of internally threaded hollow sleeves each having at least two pairs of standoffs on opposite sides for index mating in the notches along the top edges of an associated mounting stud;

said plurality of sleeves each further including about their outside walls, opposing longitudinal ribs lying in a plane perpendicular to the plane intercepting said standoffs, said ribs being parallel to the longitudinal axis of their associated sleeve, with either one of said ribs serving as a key to mate with said channel of an associated stud;

said plurality of sleeves each further including a first band-like collar at one end, and a second band-like collar inward of the opposite end of said sleeve, said first and second collars each projecting away from the outside wall of their associated sleeve, and being spaced apart from one another a distance substantially the same as the length of each one of said plurality of studs, for providing a snug fit therebetween.

10. A linear according to claim 9, wherein said plurality of sleeves are ultrasonically welded into associated ones of said plurality of studs.

11. A liner according to claim 9, wherein said bezel and said plurality of studs are formed in one piece of material.

12. A linear according to claim 9, wherein said bezel and said plurality of studs are fabricated in one piece consisting of a plastic material.

13. A linear according to claim 9, wherein said plurality of internally threaded sleeves are each adapted for receiving an associated hollow bolt for adjustably aligning said yoke assembly with said CRT.

14. A deflection yoke assembly for a cathode ray tube (CRT), comprising:

a liner for mounting deflection coils of said deflection yoke assembly over rear diverging walls and neck of said CRT;

a plurality of studs mounted spaced apart about an outside circumference of a ring-like front bezel of said liner; and a plurality of internally threaded sleeves adapted for being rigidly mounted partially within and upon associated ones of said plurality of studs.

* * * * *